(12) United States Patent
Hwang et al.

(10) Patent No.: US 12,715,519 B2
(45) Date of Patent: Aug. 25, 2026

(54) FLOOR MODULE FOR VEHICLE

(71) Applicants: Hyundai Motor Company, Seoul (KR); Kia Corporation, Seoul (KR)

(72) Inventors: Jin Ho Hwang, Cheonan-si (KR); Sang heon Lee, Seoul (KR); Dong Eun Cha, Hwaseong-si (KR); Jin Man Park, Busan (KR); Eun Gook Kim, Sejong-si (KR); Hyoung Jun Kim, Cheongju-si (KR)

(73) Assignees: MOTOR CORPORATION, Seoul (KR); KIA CORPORATION, Seoul (KR)

( * ) Notice: Subject to any disclaimer, the term of this patent is extended or adjusted under 35 U.S.C. 154(b) by 381 days.

(21) Appl. No.: 18/387,584

(22) Filed: Nov. 7, 2023

(65) Prior Publication Data

US 2024/0417002 A1 Dec. 19, 2024

(30) Foreign Application Priority Data

Jun. 14, 2023 (KR) ........................ 10-2023-0076207

(51) Int. Cl.
*B62D 25/20* (2006.01)
*B60R 13/02* (2006.01)

(52) U.S. Cl.
CPC ......... *B62D 25/20* (2013.01); *B62D 25/2009* (2013.01); *B60R 2013/0293* (2013.01)

(58) Field of Classification Search
CPC ............ B62D 25/2072; B62D 25/2054; B62D 25/20; B62D 25/2009; B60R 13/0206;
(Continued)

(56) References Cited

U.S. PATENT DOCUMENTS 4,736,555 A * 4/1988 Nagare ............. E04F 15/02494 248/561
5,245,805 A * 9/1993 Takeda .................. H02G 3/285 52/177

(Continued)

FOREIGN PATENT DOCUMENTS

JP 5489980 B2 5/2014
JP 2016518539 A 6/2016

(Continued)

OTHER PUBLICATIONS

Translation (Year: 2023).*

*Primary Examiner* — Amy R Weisberg
*Assistant Examiner* — Denise L. Esquivel
(74) *Attorney, Agent, or Firm* — Morgan, Lewis & Bockius LLP

(57) ABSTRACT

A floor module for a vehicle includes a plurality of tile portions configured to cover a vehicle floor of a vehicle and sequentially aligned by being coupled in a transverse direction, a plurality of fixing portions provided below the tile portions, connected to the tile portions in an upward and downward direction, and sequentially aligned by being coupled in the transverse direction, and a plurality of mounting portions provided above the vehicle floor and configured to support the tile portions and the fixing portions from below by being connected to the fixing portions in the upward and downward direction in a state in which the tile portions and the fixing portions are matched.

18 Claims, 15 Drawing Sheets

(58) Field of Classification Search
CPC .............. B60R 2013/0293; B60N 2/07; B60Y 2304/07
USPC ......... 296/193.07, 39.1, 39.3, 193.04, 65.13; 52/177, 263, 403.1, 588.1
See application file for complete search history.

(56) References Cited

U.S. PATENT DOCUMENTS 6,189,289 B1 * 2/2001 Quaglia ................ E04F 15/024 52/220.1
6,202,374 B1 * 3/2001 Cooper .................. H02G 3/285 52/220.8
7,350,853 B2 * 4/2008 Fitze .................... B62D 29/005 410/104
7,634,876 B2 * 12/2009 Moller, Jr. ........ E04F 15/02172 52/592.1
8,650,824 B2 * 2/2014 DeLong .................. E04F 21/22 52/403.1
9,637,026 B2 * 5/2017 Cardone ................ B60N 2/245
9,868,405 B1 * 1/2018 Fischer ................... B60R 13/01
2007/0204539 A1 * 9/2007 Owen ............... E04F 15/02452 52/263
2007/0277453 A1 * 12/2007 Trageser ................. E01C 9/083 52/177
2008/0141601 A1 * 6/2008 Mead ................ E04F 15/02452 52/126.6
2011/0006562 A1 * 1/2011 Campbell ............... B60R 13/01 296/193.04
2024/0217590 A1 * 7/2024 Oh ......................... B62D 25/20

FOREIGN PATENT DOCUMENTS

KR 10-2009-0003346 A 1/2009
KR 10-2398598 B1 5/2022
KR 20230171523 A * 12/2023 ............. B60R 13/02
WO 2008119003 A3 12/2008
WO 2014/169328 A1 10/2014

* cited by examiner

[FIG. 1]
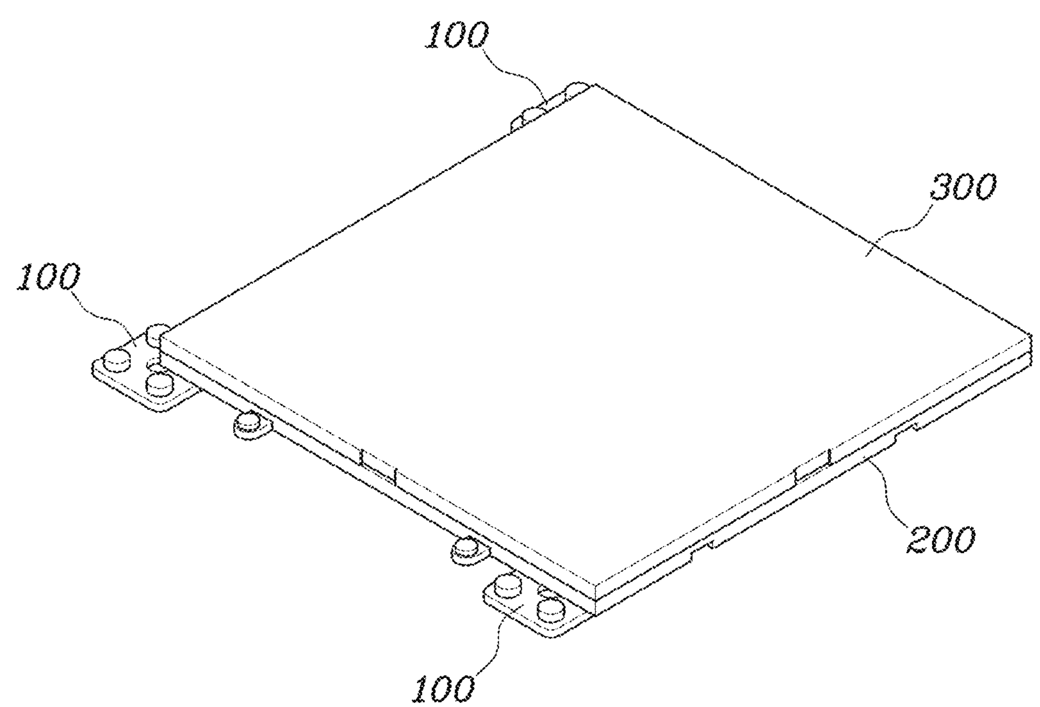

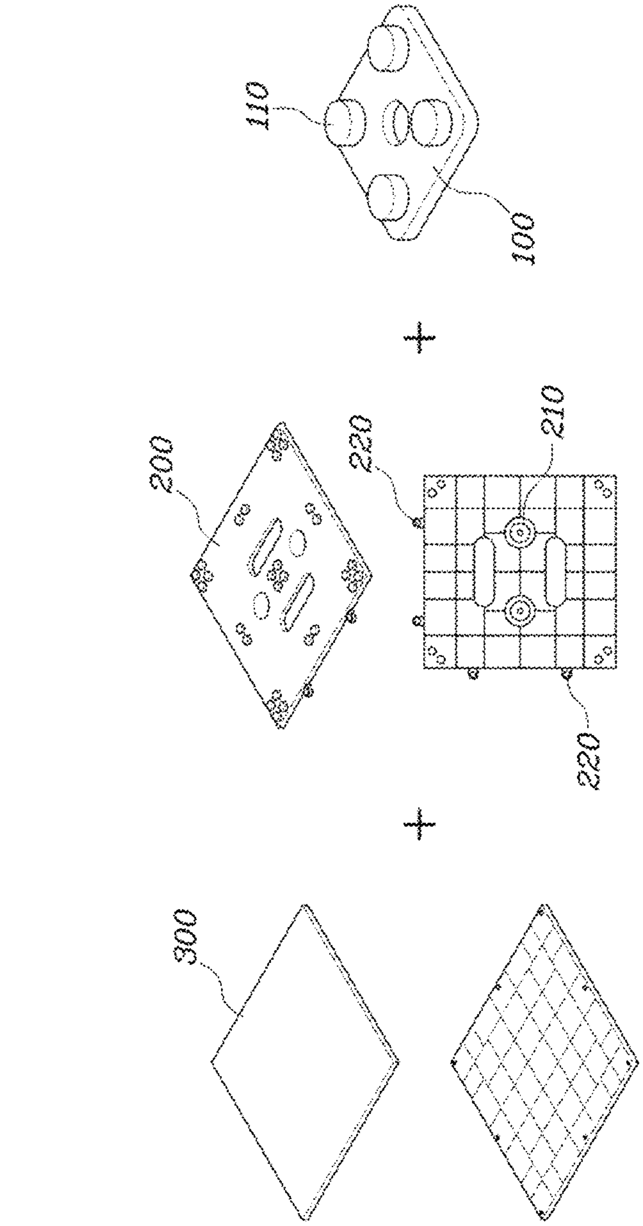
【FIG.2】
110
100
200
220
210
220
300

[FIG. 3]
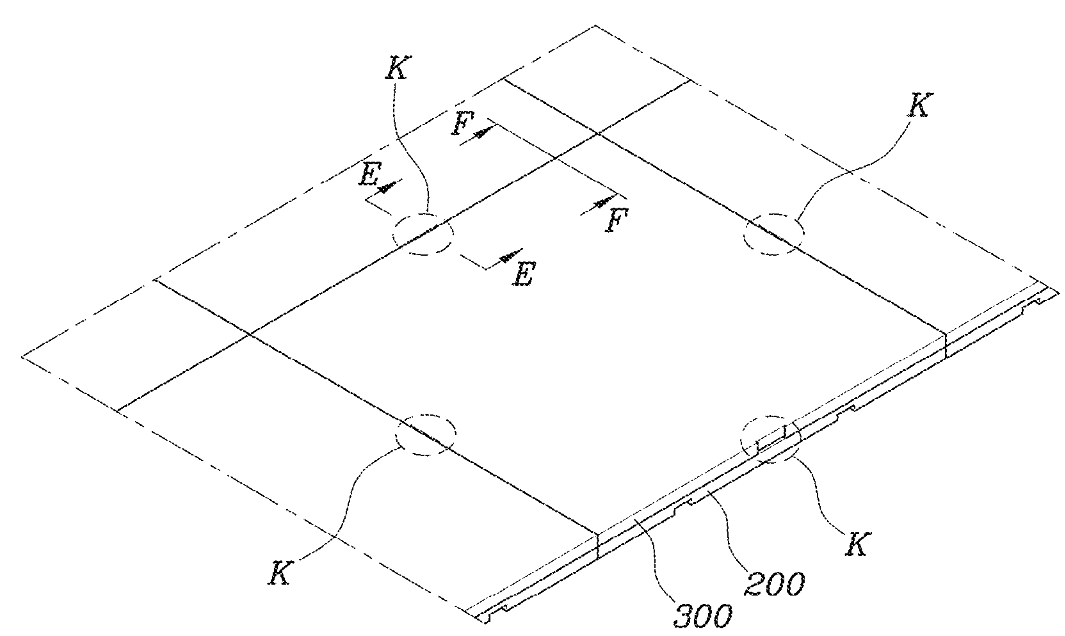

[FIG. 4]
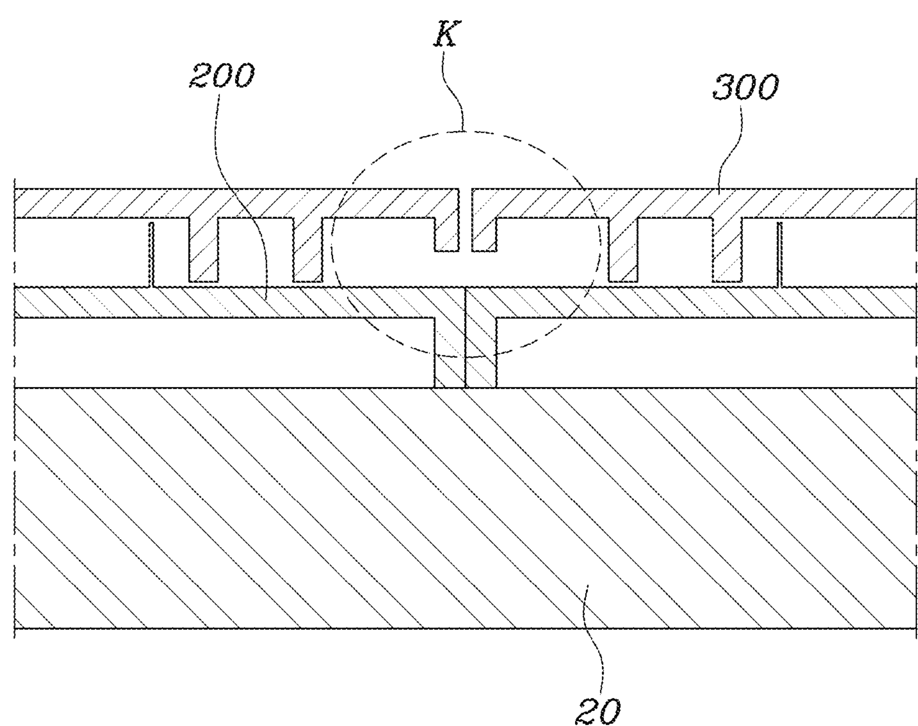

[FIG. 5]
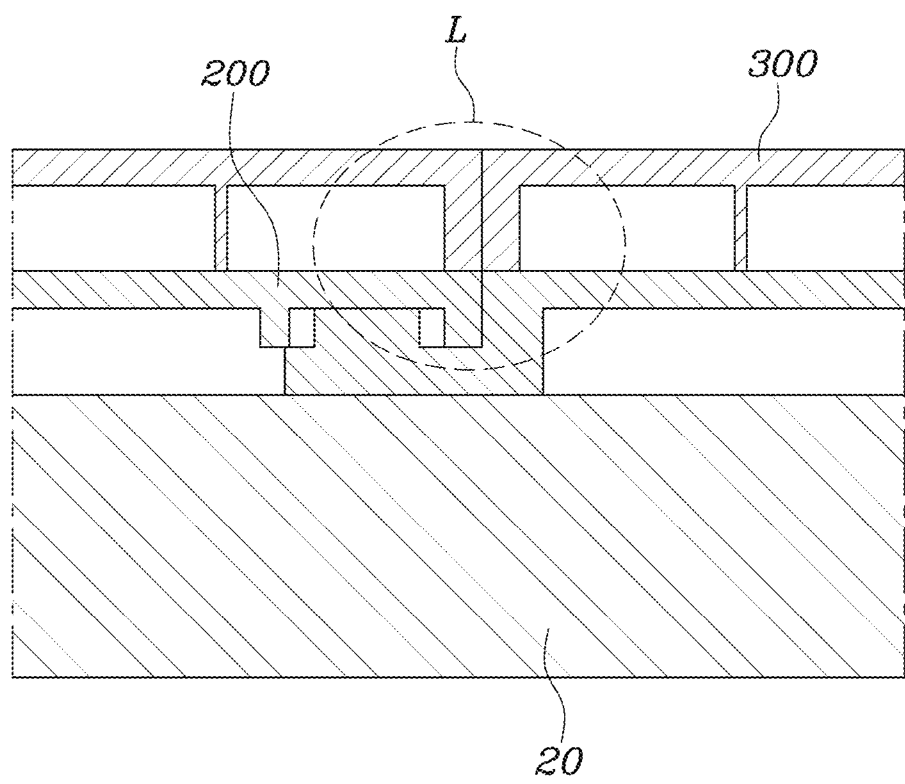

[FIG. 6]
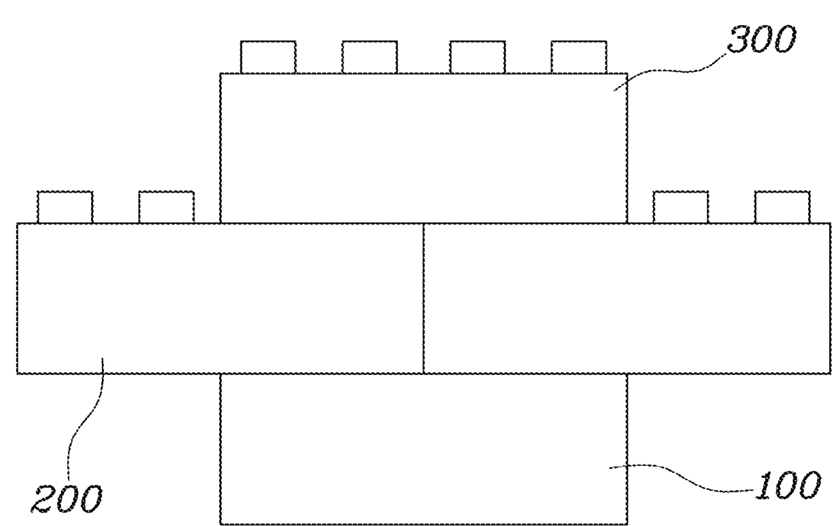

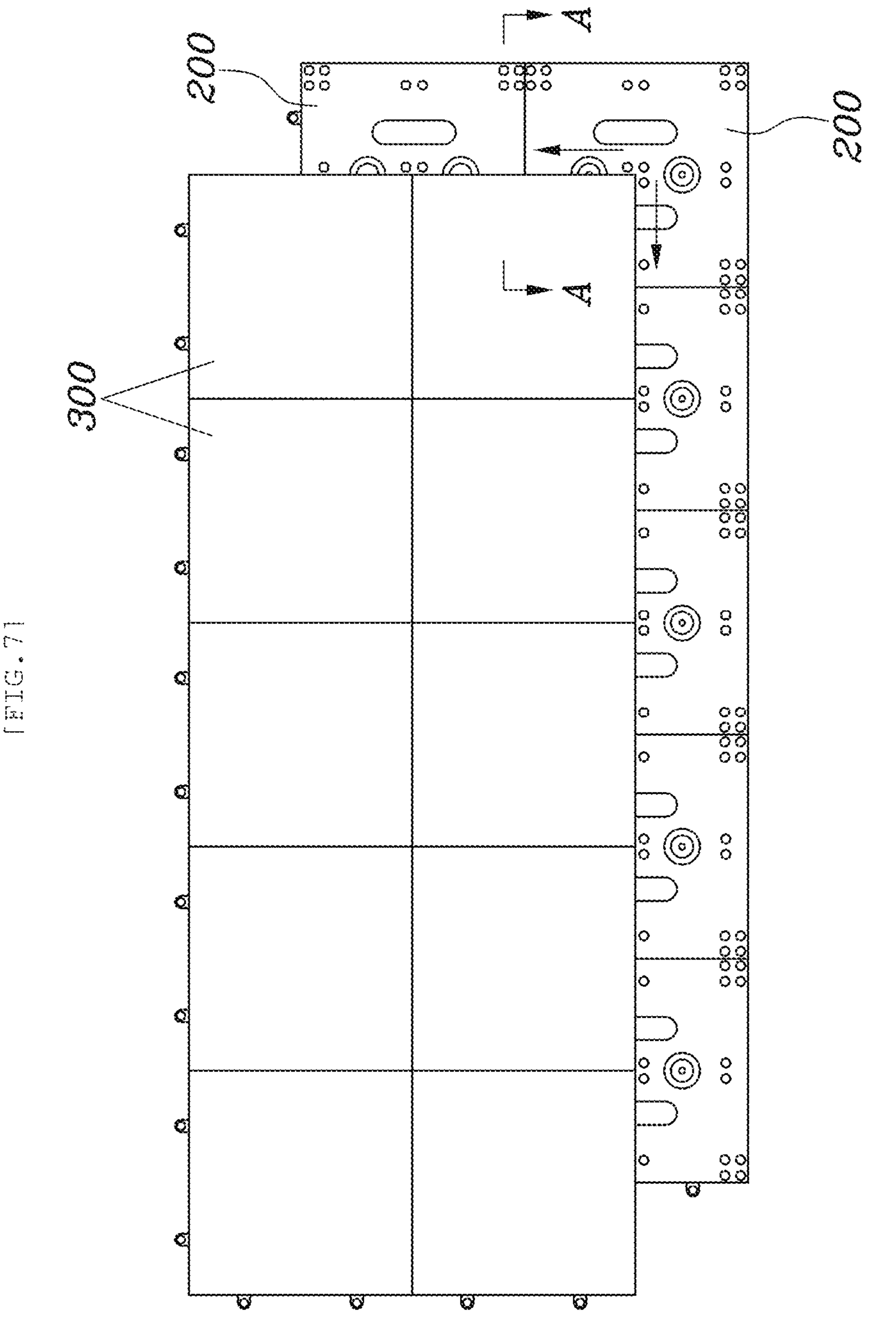
[FIG. 7]

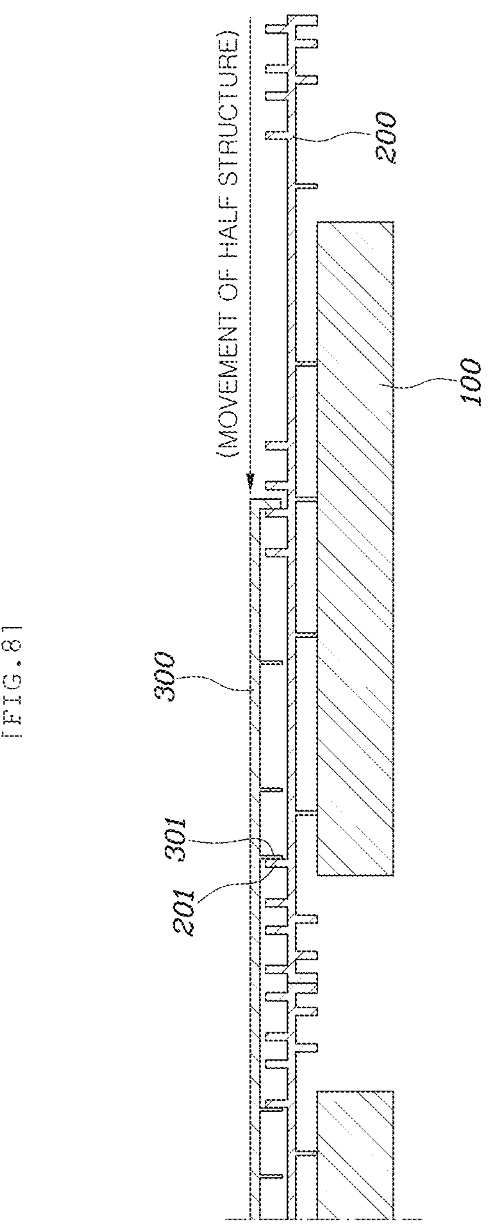
[FIG.8]
(MOVEMENT OF HALF STRUCTURE)
200
100
300
301
201

[FIG. 9]
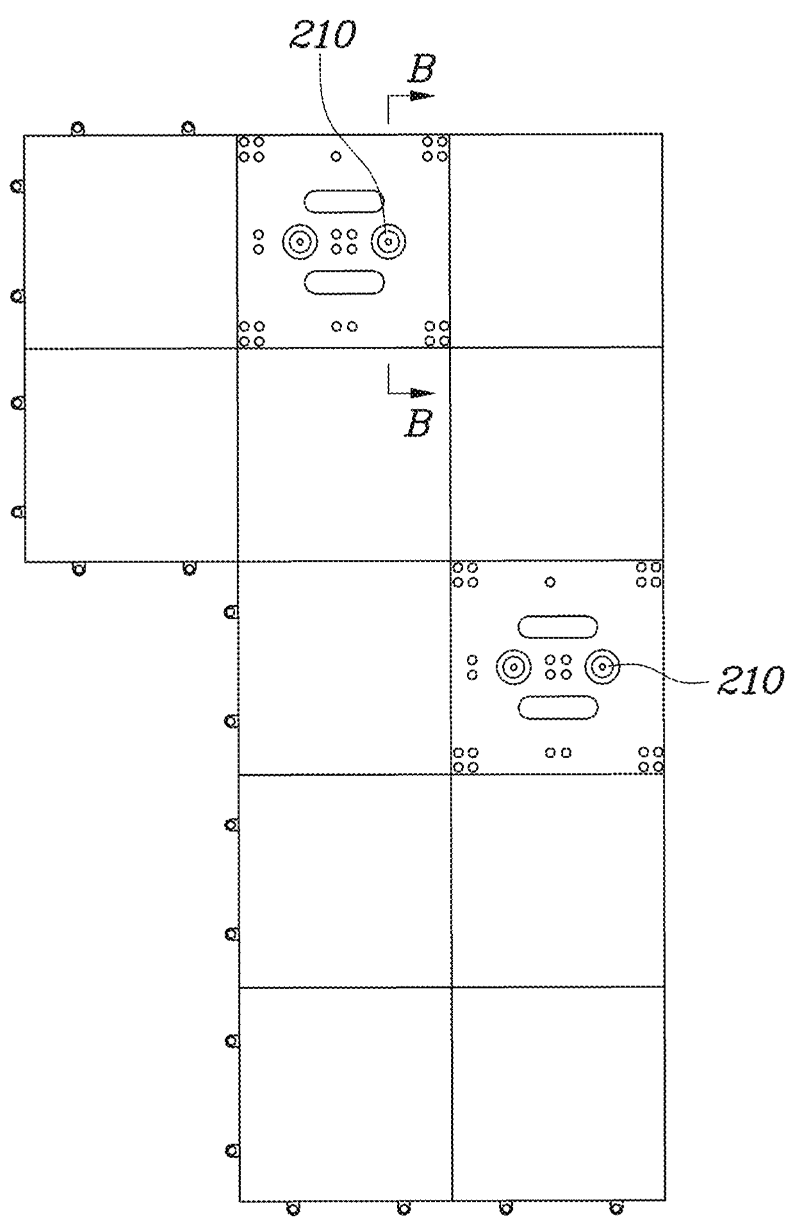

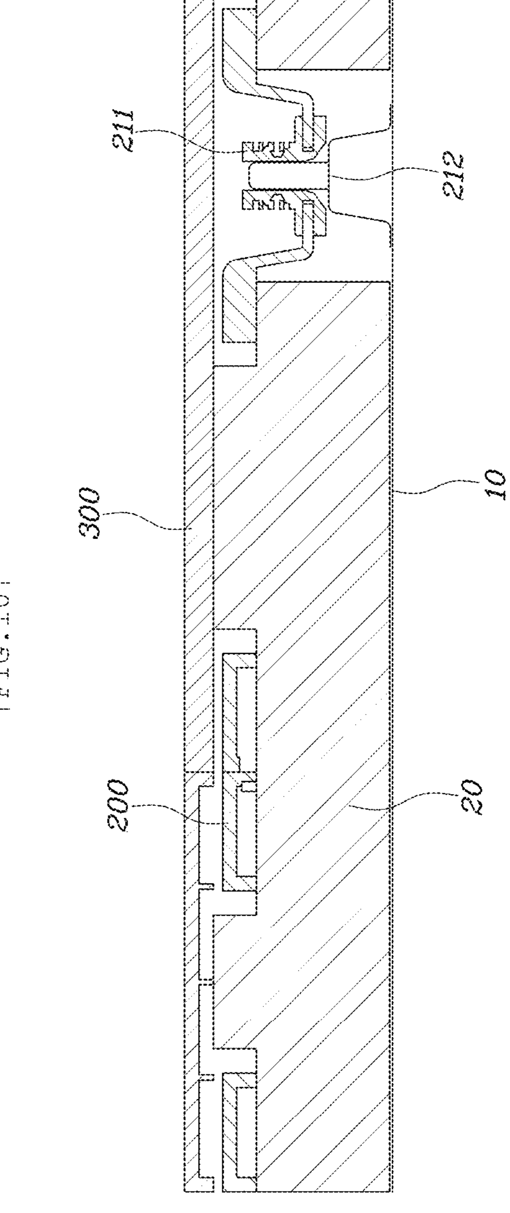
211
212
300
10
[FIG.10]
200
20

[FIG. 11]
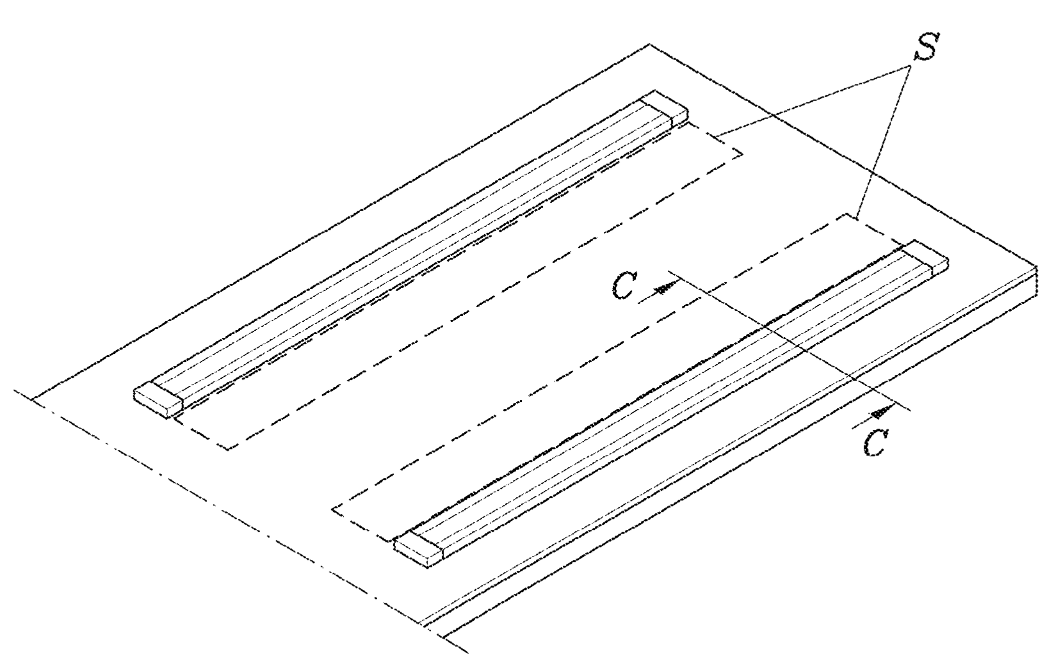

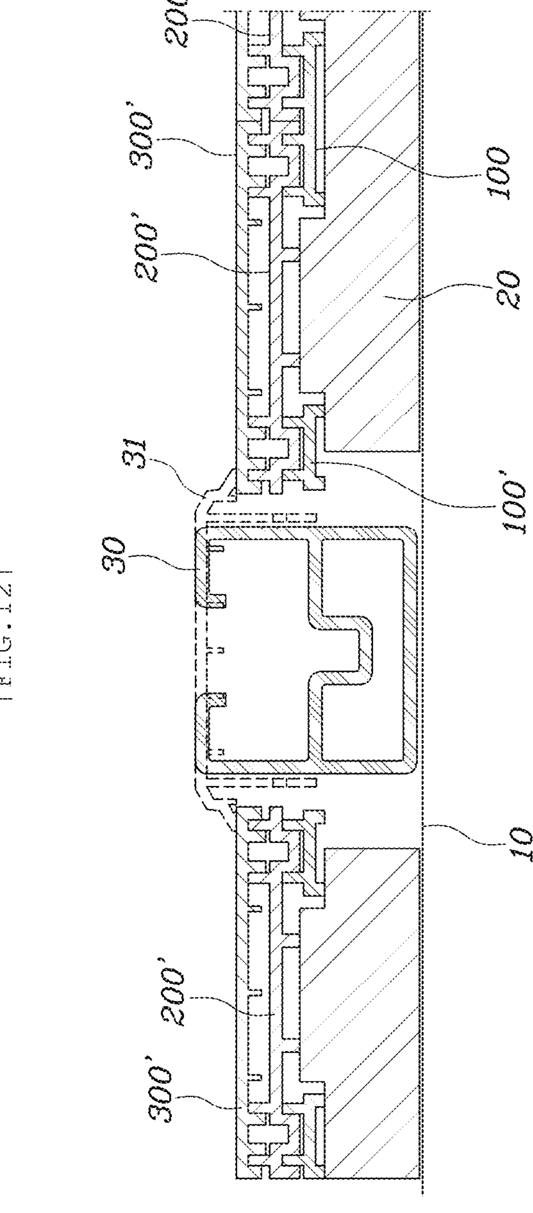
【FIG.12】

[FIG. 13]
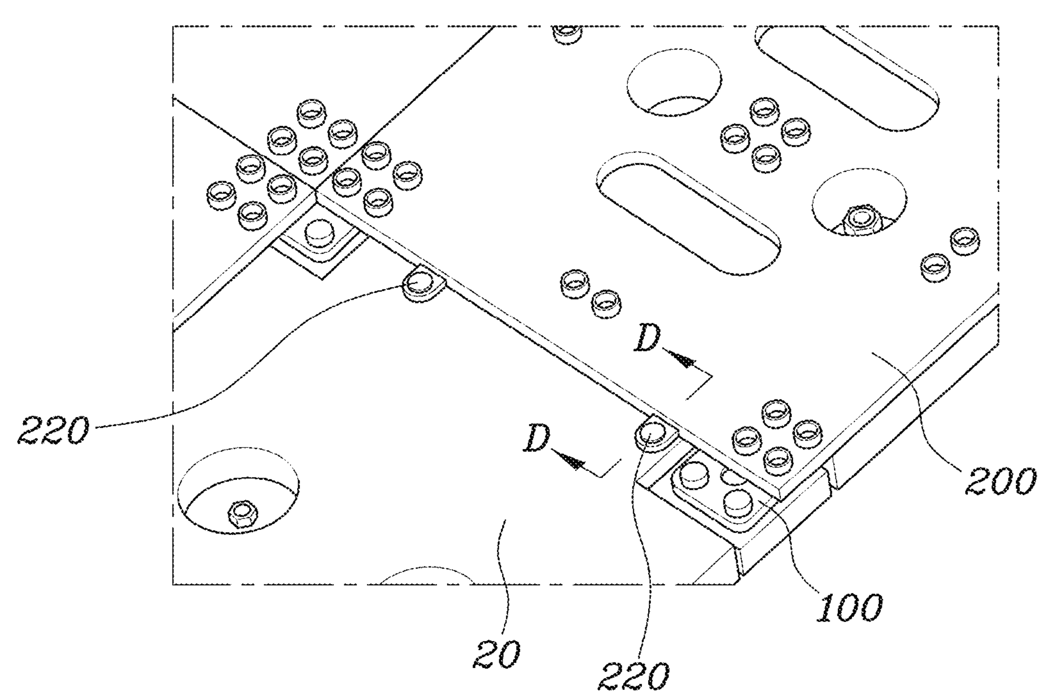

[FIG. 14]
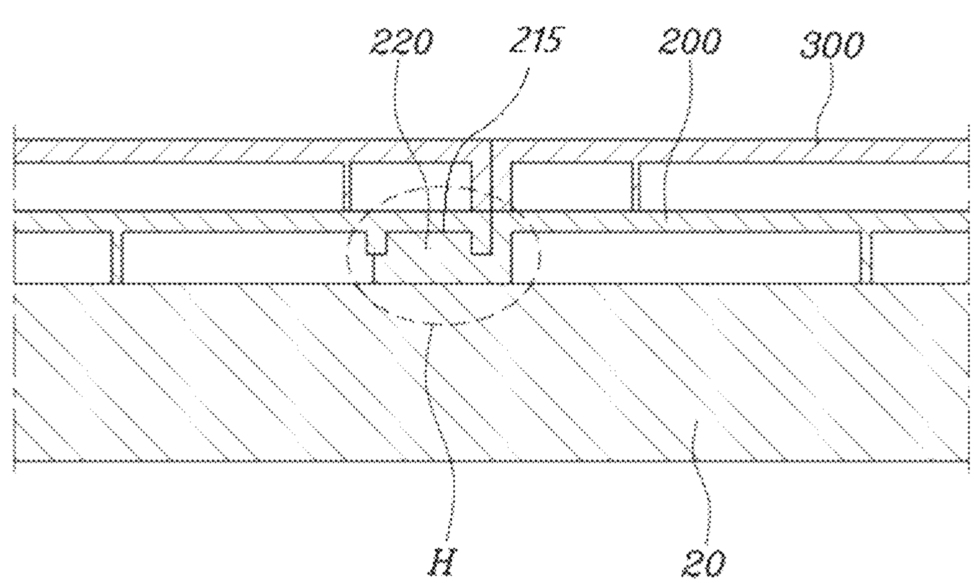

[FIG. 15]
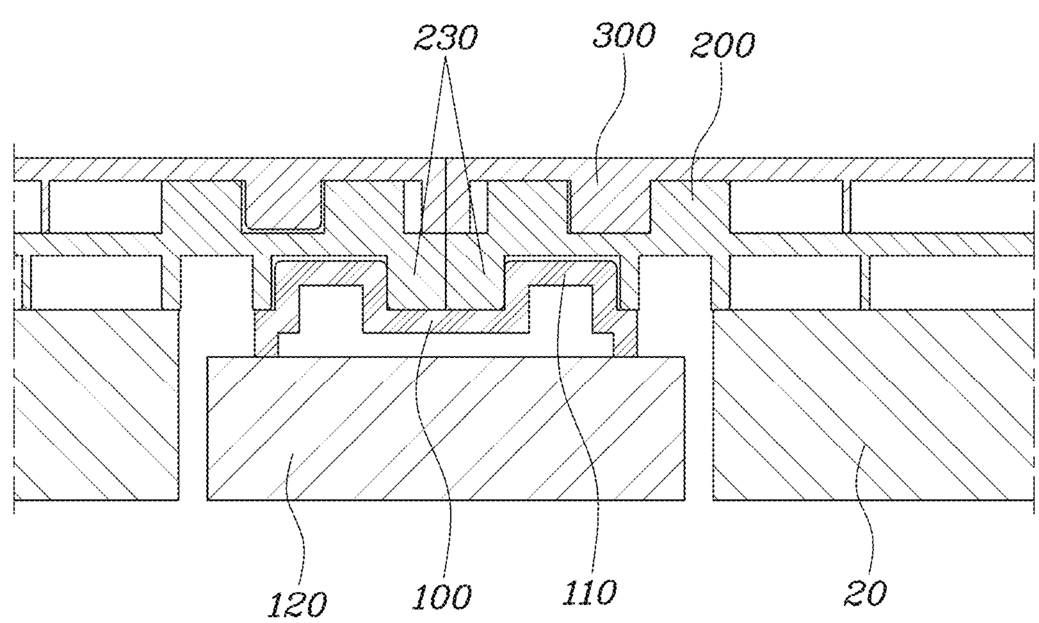

FLOOR MODULE FOR VEHICLE

CROSS-REFERENCE TO RELATED APPLICATION

The present application claims priority to Korean Patent Application No. 10-2023-0076207 filed on Jun. 14, 2023, the entire contents of which is incorporated herein for all purposes by this reference.

BACKGROUND OF THE PRESENT DISCLOSURE

Field of the Present Disclosure

The present disclosure relates to a floor module for a vehicle, and more particularly, to a floor module for a vehicle, which is capable of ensuring rigidity of tiles and fixing the tiles to a vehicle floor by changing a configuration of a tile structure in a structure in which the tiles are applied to the vehicle floor.

Description of Related Art

Recently, purpose-built vehicles (PBVs) have been introduced as modularized devices including a simple structure which may be designed to satisfy various requirements at a time point desired by customers. The purpose-built vehicle refers to an environmental-friendly multipurpose mobility vehicle which may be provided with low costs to conform to the business purposes and requirements of the customer. As market demands increase, there is an increasing need to produce a small number of various types of purpose-built vehicles.

Meanwhile, because the vehicle is a movable means unlike a residential space, a tile structure is vulnerable to noise and impact when the tile structure is applied to a vehicle floor. For the present reason, it is difficult to apply the tile structure to the vehicle without change. Furthermore, even though the tile structure is applied to the vehicle, a significantly large amount of repair costs are required when some tiles are damaged, which causes great inconvenience.

Furthermore, it is difficult for an occupant in the vehicle to customize the vehicle floor by changing a floor module for a vehicle or change a material of the vehicle floor in accordance with the occupant's preference.

Accordingly, there is a demand for a configuration of a tile for a vehicle floor which may be customized while ensuring the rigidity of a tile structure.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a floor module for a vehicle, which is configured for ensuring rigidity of tiles and fixing the tiles to a vehicle floor by changing a configuration of a tile application structure in a structure in which the tiles are applied to the vehicle floor.

Technical problems to be solved by the present disclosure are not limited to the above-mentioned technical problems, and other technical problems, which are not mentioned above, may be clearly understood from the following descriptions by those skilled in the art to which the present disclosure pertains.

According to one aspect, there is provided a floor module for a vehicle, the floor module including: a plurality of tile portions configured to cover a vehicle floor of a vehicle and sequentially aligned by being coupled in a transverse direction thereof; a plurality of fixing portions provided below the tile portions, connected to the tile portions in an upward and downward direction, and sequentially aligned by being coupled in the transverse direction thereof; and a plurality of mounting portions provided above the vehicle floor and configured to support the tile portions and fixing portions from below by being connected to the fixing portions in the upward and downward direction in a state in which the mounting portions are matched with the tile portions and the fixing portions.

For example, indentations, which are indented inwardly, may be formed in center portions of respective sides of the tile portions, and the indentation may allow the tile portions to be disconnected from the fixing portions by external pressure.

For example, the fixing portions and the tile portions may be disposed to be staggered in the transverse direction, and the fixing portions and the tile portions may be connected in the upward and downward direction in a state in which the fixing portions and the tile portions are disposed to be staggered.

For example, the floor module may further include: a seat rail portion provided above the vehicle floor and configured to traverse the vehicle floor and support a vehicle seat from therebelow, in which sizes of the tile portions, the fixing portions, and the mounting portions, which are provided at a point that adjoins the seat rail portion, are determined as a size of the seat rail portion.

For example, a rail cover may be provided above the seat rail portion, and first and second opposite end portions of the rail cover may be bent downward and adjoin the tile portions.

For example, the tile portions and the fixing portions may each include a plurality of fitting protrusions at one side thereof, and the fixing portions may be fixed in the transverse direction by the fitting protrusions of the tile portions when the fixing portions are connected to the tile portions in the upward and downward direction.

For example, the tile portions and the fixing portions may be spaced from each other at a predetermined interval in the transverse direction and connected in the upward and downward direction in a state in which the tile portions and the fixing portions are sequentially aligned.

For example, the tile portions, the fixing portions, and the mounting portions are provided to be separable from one another.

For example, a flange portion may extend from a lateral surface of the fixing portions, and the plurality of fixing portions may be coupled by fitting and sequentially aligned in the transverse direction by the flange portions.

For example, the flange portions may be provided symmetrically based on a center portion of each of the sides of the fixing portions.

For example, a fastening hole may be formed in a center portion of the fixing portions, the fixing portions may be fastened, by bolting, to the vehicle floor in the upward and downward direction through the fastening hole so that the fixing portions are fixed to the vehicle floor.

For example, a protruding portion may extend upwards from the mounting portions, and the mounting portions may be fastened to the fixing portions by the protruding portion and connected to the fixing portions in the upward and downward direction when the mounting portions are connected to the fixing portions.

For example, the mounting portions may be disposed below each corner of the fixing portions and support the tile portions and the fixing portions from below.

According to the floor module for a vehicle of the present disclosure, it is possible to ensure the rigidity of the tiles and fix the tiles to the vehicle floor by changing the configuration of the tile application structure in the structure in which the tiles are applied to the vehicle floor.

Furthermore, the tiles may be easily replaced and mounted, which makes it possible to customize the tile by replaceably mounting the tile purchased from the aftermarket and to easily cope with the breakdown of the tile.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The effects capable of being obtained by the present disclosure are not limited to the aforementioned effects, and other effects, which are not mentioned above, will be clearly understood by those skilled in the art from the following description.

BRIEF DESCRIPTION OF THE DRAWINGS

FIG. 1 is a view exemplarily illustrating a floor module for a vehicle according to an exemplary embodiment of the present disclosure.

FIG. 2 is a view exemplarily illustrating constituent elements of the floor module for a vehicle according to the exemplary embodiment of the present disclosure.

FIG. 3 is a view exemplarily illustrating an indentation formed in a tile portion according to the exemplary embodiment of the present disclosure.

FIG. 4 and FIG. 5 are views respectively illustrating a cross-section taken along line E-E in FIG. 3 and a cross-section taken along line F-F in FIG. 3.

FIG. 6 and FIG. 7 are views exemplarily illustrating a state in which the tile portion and a fixing portion according to the exemplary embodiment of the present disclosure are disposed to be staggered in a transverse direction thereof.

FIG. 8 is a view exemplarily illustrating a cross-section taken along line A-A in the state in which the tile portion and the fixing portion are disposed to be staggered in the transverse direction thereof.

FIG. 9 and FIG. 10 are views exemplarily illustrating a state in which the fixing portion is fixed to a vehicle floor through a fastening hole according to the exemplary embodiment of the present disclosure.

FIG. 11 is a view exemplarily illustrating a configuration of a seat rail portion according to the exemplary embodiment of the present disclosure.

FIG. 12 is a view exemplarily illustrating a cross-section taken along line C-C in a state in which the seat rail portion in FIG. 11 is disposed.

FIG. 13 and FIG. 14 are views exemplarily illustrating flange portions according to the exemplary embodiment of the present disclosure and a state in which a plurality of fixing portions are coupled by fitting and aligned by the flange portions.

FIG. 15 is a view exemplarily illustrating a state in which the mounting portion is connected to the fixing portion by protruding portions according to the exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification. Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure. The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element may be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

An exemplary embodiment of the present disclosure is provided to ensure rigidity of tiles and fix the tiles to a vehicle floor by changing a configuration of a tile structure in a structure in which the tiles are applied to the vehicle floor.

FIG. 1 is a view exemplarily illustrating a floor module for a vehicle according to an exemplary embodiment of the present disclosure. FIG. 1 is mainly focused on constituent elements related to the exemplary embodiment of the present disclosure. However, an actually implemented floor module for a vehicle may, of course, include more or fewer constituent elements.

With reference to FIG. 1, the floor module for a vehicle according to the exemplary embodiment of the present disclosure may include tile portions 300, fixing portions 200, and mounting portions 100. The respective constituent elements will be described with reference to FIG. 2. FIG. 2 is a view exemplarily illustrating the constituent elements of the floor module for a vehicle according to the exemplary embodiment of the present disclosure.

First, the tile portion 300 may be provided as a plurality of tile portions 300. The plurality of tile portions 300 may cover a vehicle floor 20 of a vehicle and be sequentially aligned by being coupled in a transverse direction thereof. The tile portions 300 may each be formed in a square shape and disposed at predetermined intervals to cover the vehicle floor 20. The tile portion 300 may be made of various materials such as glass, metal, plastic, and leather. In the instant case, a sound-absorbing layer is applied to the inside of the tile portion 300 to maximize noise, vibration, and harshness (NVH) performance of the vehicle. A raw fabric, film, or the like may be applied to a surface of the tile portion 300. Furthermore, upper surfaces of the plurality of aligned tile portions 300 are in parallel to the vehicle floor 20 to allow an occupant accommodated in a PBV to feel comfortable while the vehicle travels. Edge portions of the plurality of tile portions 300 are bent downward so that external appearance gaps defined by the plurality of tile portions 300 are minimized, maximizing sound-blocking performance. With reference to FIG. 2, the fixing portion 200 may be provided on a lower portion of the tile portion 300 and connected to the tile portion 300 in an upward and downward direction thereof. Furthermore, the mounting portion 100 may be connected to the fixing portion 200 in the upward and downward direction in a state in which the tile portion 300 and the fixing portion 200 are matched with each other.

The fixing portion 200 and the mounting portion 100 will be described below.

FIG. 3 is a view exemplarily illustrating an indentation formed in the tile portion 300 according to the exemplary embodiment of the present disclosure. With reference to FIG. 3, indentations, which are indented inwardly, may be formed in center portions (regions K) of respective sides of the tile portion 300. The indentation is configured to allow the tile portion 300 to be disconnected from the fixing portion 200 when external pressure is applied to the tile portion 300. In case that the tile portion 300 is broken or required to be repaired, the tile portion 300 is easily detached by a simple tool such as a rubber spatula instead of a screw driver.

This will be described more with reference to FIG. 4 and FIG. 5.

FIG. 4 and FIG. 5 are views respectively illustrating a cross-section taken along line E-E in FIG. 3 and a cross-section taken along line F-F in FIG. 3. With reference to FIG. 4, in regions K, which is the center portions of the respective sides of the tile portion 300, the plurality of tile portions 300, which is sequentially aligned, are kept disposed at predetermined intervals without adjoining one another. When external pressure is applied to the present portion, the tile portion 300 may be disconnected from the fixing portion 200. With reference to FIG. 5, in region L, which is a region in which the plurality of tile portions 300 adjoins one another, except for the center portions of the respective sides and the tile portion 300, the tile portion 300 is hardly disconnected from the fixing portion 200 even though external pressure is applied to the tile portion 300. Therefore, the tile portion 300 may be easily replaced through region K so that the tile purchased from the aftermarket may be replaceably mounted, and the tile portion 300 may be customized in accordance with personal preference.

Furthermore, like the tile portion 300, the fixing portion 200 may be provided as a plurality of fixing portions 200. The plurality of fixing portions 200 may be sequentially aligned by being coupled in the transverse direction thereof. The fixing portion 200 may be positioned between the tile portion 300 and the mounting portion 100 and fix the tile portion 300, ensuring the rigidity of the tile portion 300. Furthermore, the fixing portion 200 may be fastened to the vehicle floor 20 through fastening holes 210 and robustly fixed to a vehicle body.

A method of disposing the plurality of tile portions 300 and the fixing portion 200 will be described in detail.

FIG. 6 and FIG. 7 are views exemplarily illustrating a state in which the tile portion 300 and the fixing portion 200 according to the exemplary embodiment of the present disclosure are disposed to be staggered in the transverse direction thereof. The tile portion 300 and the fixing portion 200 may be assembled at positions matched with each other in a one-to-one manner. However, as illustrated in FIG. 6, when the tile portion 300 and the fixing portion 200 are assembled to be staggered, an effect of additionally improving rigidity may be expected in comparison with the case in which the tile portion 300 and the fixing portion 200 are assembled at positions matched with each other in a one-to-one manner. As illustrated in FIG. 7, the tile portion 300 and the fixing portion 200 may be assembled in a ½ staggered manner. When the fixing portion 200 and the tile portion 300 are disposed to be staggered in the transverse direction as the tile portion 300 is moved by ½, pressure caused by an external collision of the vehicle may be dispersed without being concentrated on the edge portions of the tile portion 300 and the edge portions of the fixing portion 200, improving the rigidity of the tile.

FIG. 8 is a view exemplarily illustrating a cross-section taken along line A-A in the state in which the tile portion 300 and the fixing portion 200 are disposed to be staggered in the transverse direction thereof. With reference to FIG. 8, the tile portion 300 and the fixing portion 200 may each include a plurality of fitting protrusions 201 and 301 formed at one side thereof.

The fitting protrusions 301, which extend downwardly from the tile portion 300, and the fitting protrusions 201, which extend upwards from the fixing portion 200, are fixedly supported on one another in the transverse direction so that the tile portion 300 and the fixing portion 200 are connected in the upward and downward direction.

As described above, as the tile portion 300 is moved by ½, the fixing portion 200 may be connected to the tile portion 300 in the state in which the fixing portion 200 and the tile portion 300 are disposed to be staggered by a ½ (half) size in the transverse direction. The floor module for a vehicle has been described as being configured so that the tile portion 300 and the fixing portion 200 are disposed to be staggered by a ½ size. However, the present configuration is provided for illustrative purposes only, and the present disclosure is not necessarily limited to the present configuration. It is apparent to those skilled in the art that various modifications, such as an arrangement at a predetermined interval, may be made to improve rigidity.

FIG. 9 and FIG. 10 are views exemplarily illustrating a state in which the fixing portion 200 is fixed to the vehicle floor 20 through the fastening hole 210 according to the exemplary embodiment of the present disclosure.

With reference to FIG. 9 and FIG. 10, the fastening hole 210 may be formed in a center portion of the fixing portion 200. The fastening hole 210 is provided as a plurality of fastening holes 210. During a fastening process, the fixing portion 200, the vehicle floor 20, and a vehicle body panel 10 are fastened in the upward and downward direction by bolting, which improves the rigidity of the tile. The plurality of tile portions 300 may be assembled in a state in which the plurality of tile portions 300 is sequentially aligned. In a state in which the tile portion 300, which is matched with the fixing portion 200, is removed, a fixing plug 211 is fitted into a stud bolt 212 that connects the vehicle floor 20 and the vehicle body panel 10, and then the tile portions 300 are assembled. In the instant case, the position of the fixing plug 211 and the number of fixing plugs 211 may be differently set for each vehicle.

FIG. 11 is a view exemplarily illustrating a configuration of a seat rail portion 30 according to the exemplary embodiment of the present disclosure. FIG. 12 is a view exemplarily illustrating a cross-section taken along line C-C in a state in which the seat rail portion 30 in FIG. 11 is disposed.

With reference to FIG. 11, the seat rail portion 30 may be provided above the vehicle floor 20 and traverse the vehicle floor 20. The seat rail portion 30 may support a vehicle seat from below. The vehicle seat in the PBV vehicle may be supported from below by the seat rail portion 30. Furthermore, sizes of the tile portion 300, the fixing portion 200, and the mounting portion 100, which are provided at a point (region S) that adjoins the seat rail portion 30, may be determined as a size of the seat rail portion 30. An overall size of the tile portion 300 needs to enter a lateral side of the seat rail portion 30, but a space for accommodating the entire tile portion 300 is limited by the seat rail portion 30. For example, based on the present size, the tile portion 300' and the fixing portion 200' each having a ⅓ size may be disposed, and the mounting portion 100' having a ½ size may be disposed.

With reference to FIG. 12, a rail cover 31 may be provided above the seat rail portion 30. Two opposite end portions of the rail cover 31 are bent downward and formed to adjoin the tile portion 300. The rail cover 31 may cover a spacing interval between the tile portion 300 and the seat rail portion 30, compensating for deterioration in rigidity caused when the seat rail portion 30 is disposed.

FIG. 13 and FIG. 14 are views exemplarily illustrating flange portions 220 according to the exemplary embodiment of the present disclosure and a state in which the plurality of fixing portions 200 are coupled by fitting and aligned by the flange portions 220.

With reference to FIG. 13, the flange portions 220 may extend from lateral surfaces of the center portions of the respective sides of the fixing portion 200 and be disposed symmetrically. The plurality of fixing portions 200 may be coupled by fitting and sequentially aligned in the transverse direction by the flange portions 220. With reference to FIG. 14 illustrating a cross-section taken along line D-D in FIG. 13, the flange portions 220 are coupled, by fitting, to the other fixing portions 200 sequentially disposed on the lateral surfaces of the fixing portion 200 in region H so that the rigidity of the plurality of aligned fixing portions 200 is improved as a whole.

In an exemplary embodiment of the present disclosure, the fixing portions 200 include a locking groove 215 into which the flange portions 220 are engaged so that the rigidity of the plurality of aligned fixing portions 200 is improved as a whole.

Furthermore, the mounting portion 100 may be provided as a plurality of mounting portions 100. The mounting portion 100 may be provided above the vehicle floor 20 and support the tile portion 300 and the fixing portion 200 from below. The mounting portion 100 may be positioned at a lowermost end portion of the floor module for a vehicle and are configured to fix the fixing portion 200 in the upward and downward direction, fixing the tile portion 300 robustly.

FIG. 15 is a view exemplarily illustrating a state in which the mounting portion 100 is connected to the fixing portion 200 by protruding portions 110 according to the exemplary embodiment of the present disclosure.

With reference to FIG. 15, the protruding portion 110 may extend upwards from the mounting portion 100. When the mounting portion 100 is connected to the fixing portion 200, the protruding portion 110 is fastened to the fixing portion 200 so that the mounting portion 100 may be connected to the fixing portion 200 in the upward and downward direction. An engagement portion 230 of the fixing portion 200 is supported between the protruding portions 110 so that the transverse movement of the fixing portion 200 is restricted. The mounting portion 100 may each be disposed below each corner of the fixing portion 200 and support the tile portion 300 and the fixing portion 200 from below. A support portion 120 may be provided on a lower portion of the mounting portion 100 and support the mounting portion 100 from below. Therefore, the upward and downward movements of the floor module for a vehicle may be restricted so that the floor module may be fixed to the vehicle floor 20, further improving the rigidity.

Furthermore, the tile portion 300, the fixing portion 200, and the mounting portion 100 may be provided to be separable from one another. Even when at least one of the plurality of tile portions 300, the plurality of fixing portions 200, and the plurality of mounting portions 100 is broken down or required to be repaired, customization is possible, and an aftermarket product may be easily replaceably mounted, which may remarkably reduce the repair and replacement costs.

According to the exemplary embodiments of the present disclosure described above, it is possible to ensure the rigidity of the tiles and fix the tiles to the vehicle floor by changing the configuration of the tile application structure in the structure in which the tiles are applied to the vehicle floor. Furthermore, the tiles may be easily replaced and mounted, which makes it possible to customize the tile by replaceably mounting the tile purchased from the aftermarket and to easily cope with the breakdown of the tile.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A floor module for a vehicle, the floor module comprising:

a plurality of tile portions configured to cover a vehicle floor of a vehicle and sequentially aligned by being coupled in a transverse direction thereof;

a plurality of fixing portions provided below the tile portions, connected to the tile portions in an upward and downward direction, and sequentially aligned by being coupled in the transverse direction thereof; and a plurality of mounting portions provided above the vehicle floor and configured to support the tile portions and the fixing portions from therebelow by being connected to the fixing portions in the upward and downward direction in a state in which the mounting portions are matched with the tile portions and the fixing portions, wherein edge portions of the plurality of tile portions are bent downward so that gaps defined by the plurality of tile portions are minimized.

2. The floor module of claim 1, wherein indentations, which are indented inwardly, are formed in center portions of respective sides of the tile portions, and the indentations allow the tile portions to be disconnected from each other by external pressure applied in the indentations.

3. The floor module of claim 1, wherein the fixing portions and the tile portion are disposed to be staggered in the transverse direction, and the fixing portions and the tile portions are connected in the upward and downward direction in a state in which the fixing portions and the tile portions are disposed to be staggered.

4. The floor module of claim 1, further including:

a seat rail portion provided above the vehicle floor and configured to traverse the vehicle floor and support a vehicle seat from therebelow, wherein sizes of the tile portions, the fixing portions, and the mounting portions, which are provided at a point that adjoins the seat rail portion, are determined as a size of the seat rail portion.

5. The floor module of claim 4, wherein a rail cover is provided above the seat rail portion, and first and second opposite end portions of the rail cover are bent downward and adjoin the tile portions.

6. The floor module of claim 1, wherein the tile portions and the fixing portions each include a plurality of fitting protrusions at one side thereof, and the fitting protrusions of the fixing portions are fixed in the transverse direction by the fitting protrusions of the tile portions in a state that the fixing portions are connected to the tile portions in the upward and downward direction thereof.

7. The floor module of claim 1, wherein the tile portions and the fixing portions are spaced from each other at a predetermined interval in the transverse direction and connected in the upward and downward direction in a state in which the tile portions and the fixing portions are sequentially aligned.

8. The floor module of claim 1, wherein the tile portions, the fixing portions, and the mounting portions are provided to be separable from one another.

9. The floor module of claim 1, wherein a flange portion extends from a lateral surface of the fixing portions, and the plurality of fixing portions are coupled by fitting and sequentially aligned in the transverse direction by the flange portion.

10. The floor module of claim 9, wherein the flange portion is provided symmetrically based on a center portion of each of sides of the fixing portions.

11. The floor module of claim 9, wherein the fixing portion include a locking groove into which an adjacent flange portion is engaged.

12. The floor module of claim 1, wherein a fastening hole is formed in a center portion of the fixing portions, the fixing portions are fastened, by bolting, to the vehicle floor in the upward and downward direction through the fastening hole so that the fixing portions are fixed to the vehicle floor.

13. The floor module of claim 1, wherein protruding portions extend upwards from the mounting portions, and the mounting portions are fastened to the fixing portions by the protruding portions and connected to the fixing portions in the upward and downward direction in a state that the mounting portions are connected to the fixing portions.

14. The floor module of claim 13, wherein the fixing portions include an engagement portion supported between the protruding portions so that transverse movement of the fixing portions is restricted by the engagement portion.

15. The floor module of claim 1, wherein the mounting portions are disposed below each corner of the fixing portions and support the tile portions and the fixing portions from therebelow.

16. The floor module of claim 1, wherein a sound-absorbing layer is applied to an inside of the tile portions.

17. A floor module for a vehicle, the floor module comprising:

a plurality of tile portions configured to cover a vehicle floor of a vehicle and sequentially aligned by being coupled in a transverse direction thereof;

a plurality of fixing portions provided below the tile portions, connected to the tile portions in an upward and downward direction, and sequentially aligned by being coupled in the transverse direction thereof; and a plurality of mounting portions provided above the vehicle floor and configured to support the tile portions and the fixing portions from therebelow by being connected to the fixing portions in the upward and downward direction in a state in which the mounting portions are matched with the tile portions and the fixing portions, wherein the tile portions and the fixing portions each include a plurality of fitting protrusions at one side thereof, and the fitting protrusions of the fixing portions are fixed in the transverse direction by the fitting protrusions of the tile portions in a state that the fixing portions are connected to the tile portions in the upward and downward direction thereof.

18. A floor module for a vehicle, the floor module comprising:

a plurality of tile portions configured to cover a vehicle floor of a vehicle and sequentially aligned by being coupled in a transverse direction thereof;

a plurality of fixing portions provided below the tile portions, connected to the tile portions in an upward and downward direction, and sequentially aligned by being coupled in the transverse direction thereof; and a plurality of mounting portions provided above the vehicle floor and configured to support the tile portions and the fixing portions from therebelow by being connected to the fixing portions in the upward and downward direction in a state in which the mounting portions are matched with the tile portions and the fixing portions, wherein protruding portions extend upwards from the mounting portions, and the mounting portions are fastened to the fixing portions by the protruding portions and connected to the fixing portions in the upward and downward direction in a state that the mounting portions are connected to the fixing portions.

* * * * *